(12) United States Patent
Nagy et al.

(10) Patent No.: US 8,084,385 B1
(45) Date of Patent: Dec. 27, 2011

(54) CATALYSTS FOR OLEFIN POLYMERIZATION

(75) Inventors: Sandor Nagy, Naperville, IL (US); Reynald Chevalier, Frankfurt (DE)

(73) Assignee: Equistar Chemicals, L.P., Houston, TX (US)

( * ) Notice: Subject to any disclaimer, the term of this patent is extended or adjusted under 35 U.S.C. 154(b) by 21 days.

(21) Appl. No.: 12/802,570

(22) Filed: Jun. 9, 2010

(51) Int. Cl.
*C08F 4/6592* (2006.01)
*B01J 31/22* (2006.01)
*C07F 17/00* (2006.01)

(52) U.S. Cl. ........ 502/155; 502/103; 502/152; 526/133; 526/134; 526/160; 526/165; 526/943

(58) Field of Classification Search ............ 502/103, 502/152, 155; 526/133, 134, 160, 161, 165, 526/943; 556/53
See application file for complete search history.

(56) References Cited

U.S. PATENT DOCUMENTS

| | | |
|---|---|---|
| 5,034,802 A | 7/1991 | Liebes, Jr. et al. |
| 5,153,157 A | 10/1992 | Hlatky et al. |
| 5,198,401 A | 3/1993 | Turner et al. |
| 5,241,025 A | 8/1993 | Hlatky et al. |
| 5,414,180 A | 5/1995 | Geerts et al. |
| 5,648,440 A | 7/1997 | Sugano et al. |
| 6,211,311 B1 | 4/2001 | Wang et al. |

FOREIGN PATENT DOCUMENTS

EP 0791607 8/1997

OTHER PUBLICATIONS

Park, Joon T., et al., "Cyclopentadienyl-Hydrazido Titanium Complexes: Synthesis, Structure, Reactivity, and Catalytic Properties," *Organometallics*, 2000, 19, 1269-1276.

Bernardi, P., et al., "A General and Convenient Procedure for the Synthesis of N-Alkylarylamines and N-Alkylheteroarylamines by Electrophilic Amination of Cuprates with N-Alkylhydroxylamines," *Journal of Organic Chemistry*, 1999, 64, 641-643.

Somei, M., et al., "Preparations of 1-Hydroxyindole Derivatives and Their Potent Inhibitory Activities on Platelet Aggregation," *Heterocycles*, 1996, vol. 43, No. 9., 1855-1858.

Enders, M., et al., "8-Quinolylcyclopentadienyl, a Ligand with a Tailored Fit for Chelate Complexes," *Chem. Ber.*, 1996, 129, 459-463.

*Primary Examiner* — Caixia Lu

(57) ABSTRACT

Catalysts useful for polymerizing olefins are disclosed. The catalysts comprise an activator and a bridged cyclopentadienyl complex that incorporates a monoanionic hydroxylamido or hydrazido ligand fragment. Suitable complexes have the structure:

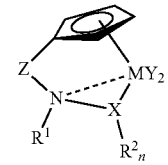

wherein M is a Group 4 metal; Z is a divalent linking group; X is N or O; each of $R^1$ and $R^2$ is independently $C_1$-$C_4$ alkyl or $C_6$-$C_{10}$ aryl; $R^1$ and $R^2$ can be joined together; n is 0 when X is O, and n is 1 when X is N; each Y is independently halide, alkyl, dialkylamido, aryl, or aralkyl. A modeling approach is used to identify particular valuable complexes, each of which incorporates a readily synthesized cyclopentadienyl precursor.

10 Claims, No Drawings

CATALYSTS FOR OLEFIN POLYMERIZATION

FIELD OF THE INVENTION

The invention relates to catalysts useful for polymerizing olefins. The catalysts comprise a complex that incorporates a monoanionic hydroxylamido or hydrazido ligand fragment.

BACKGROUND OF THE INVENTION

The modern era of polyolefin catalysis has been dominated by a shift toward single-site catalysts, particularly metallocenes, and their ability to make polymers with differential, tailored properties. "Constrained geometry" complexes are one class of such single-site catalysts (see, e.g., U.S. Pat. No. 5,064,802). The complexes feature a cyclopentadienyl ("Cp") or Cp-like ligand that coordinates to the transition metal (typically a Group 4 metal) in $\eta^5$ fashion. The Cp ligand is bridged, usually to an anionic amido group that also bonds to the metal. Upon activation, the cationic center is highly exposed, which contributes to good activity and enables excellent incorporation of α-olefin comonomers (1-butene, 1-hexene, etc.) into the growing polymer chain. Thus, catalysts having constrained geometry are particularly valuable for making materials with low or very low densities, such as LLDPE and plastomers.

Considerable efforts (discussed by Joon T. Park et al., *Organometallics* (2000) 19 1269 and references cited therein) suggest some limitations of constrained geometry complexes. In particular, changing from tetramethylcyclo-pentadienyl to the more readily available Cp or indenyl ligand generally hurts both productivity and the ability to incorporate comonomers. Changing the bridging group from the usual single-atom bridge (e.g., a divalent methylene or dimethylsilylene group) to even a simple two-carbon bridge (ethylene) has also proved unfavorable. In addition, titanium complexes appear to be much preferred over zirconium or hafnium, at least for polymerizing ethylene.

Park et al. (supra) reported interesting results with bridged cyclopentadienyl-hydrazido titanium complexes, which include coordination to Ti from a tetramethylcyclopentadienyl group that is bridged to a 1,1-disubstituted hydrazido donor, which is monoanionic and coordinates in $\eta^2$ fashion to the metal. The terminal dimethylamino group is a neutral donor that completes the three-membered chelate:

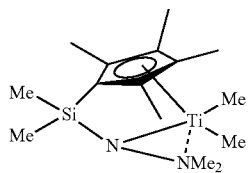

The complexes are moderately active for polymerizing ethylene in the presence of MAO or ionic borate activators. The need to synthesize the bridged Cp* ligand makes this approach challenging from an industrial perspective.

The industry would benefit from the availability of constrained geometry-like catalysts based on readily available, inexpensive cyclopentadienyl ligands. Because of the relatively poor track record of Cp complexes currently available, however, it remains a challenge to identify viable complexes of this type. Ideally, a family of complexes that share attributes of the most useful constrained geometry systems—high activity, good comonomer incorporation—could be discovered while avoiding the need to synthesize a Cp* precursor.

SUMMARY OF THE INVENTION

The invention relates to catalysts useful for polymerizing olefins. The catalysts comprise an activator and a bridged cyclopentadienyl complex that incorporates a monoanionic hydroxylamido (NO) or hydrazido (NN) ligand fragment. Using a modeling approach, we identified particular complexes of this type that should, when activated conventionally, have high activities and incorporate comonomers well, yet are based on readily synthesized cyclopentadienyl precursors. The complexes have the structure:

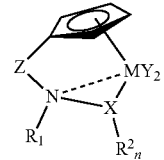

wherein M is a Group 4 metal; Z is a divalent linking group selected from the group consisting of methylene, ethylene, isopropylidene, dialkylsilylene, 1,2-phenylene, 1,8-naphthylene, and α,2-benzylene; X is N or O; each of $R^1$ and $R^2$ is independently $C_1$-$C_4$ alkyl or $C_6$-$C_{10}$ aryl; $R^1$ and $R^2$ can be joined together; n is 0 when X is O, and n is 1 when X is N; each Y is independently halide, alkyl, dialkylamido, aryl, or aralkyl. Certain complexes from this group are more limited. Thus, when M is Zr, Z is not methylene or dialkylsilylene. In addition, when M is Zr and Z is α,2-benzylene, X is N. Finally, when M is Zr and Z is 1,8-naphthylene, X is N; and when M is Ti and Z is 1,8-naphthylene, X is O.

DETAILED DESCRIPTION OF THE INVENTION

Catalysts of the invention comprise an activator and a Group 4 transition metal complex. Group 4 transition metals are zirconium, titanium, and hafnium. Titanium and zirconium are preferred.

The catalysts include an activator. The activator helps to ionize the Group 4 complex and activate the catalyst toward olefin polymerization. Suitable activators are well known in the art. Examples include alumoxanes (methyl alumoxane (MAO), modified methylalumoxane (MMAO), polymeric methylalumoxane (PMAO), ethyl alumoxane, diisobutyl alumoxane), alkylaluminum compounds (triethylaluminum, diethyl aluminum chloride, trimethylaluminum, triisobutylaluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)-aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference.

Complexes useful for the inventive catalysts comprise a bridged cyclopentadienyl complex that incorporates a monoanionic hydroxylamido (NO) or hydrazido (NN) ligand fragment. Preferably, the fragment is $\eta^2$-coordinated to the metal. In the constrained geometry catalysts known in the art, the heteroatom attached to the bridging group is anionic. In contrast, the inventive catalysts have a neutral nitrogen bonded to the bridging group, and an anionic nitrogen or oxygen bonded directly to the neutral nitrogen that is σ-bonded to the Group 4 metal. The complexes have the structure:

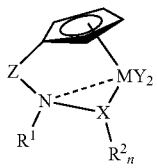

wherein M is a Group 4 metal; Z is a divalent linking group selected from the group consisting of methylene, ethylene, isopropylidene, dialkylsilylene, 1,2-phenylene, 1,8-naphthylene, and α,2-benzylene; X is N or O; each of $R^1$ and $R^2$ is independently $C_1$-$C_4$ alkyl or $C_6$-$C_{10}$ aryl; $R^1$ and $R^2$ can be joined together; n is 0 when X is O, and n is 1 when X is N; each Y is independently halide, alkyl, dialkylamido, aryl, or aralkyl. Certain complexes from this group are more limited. Thus, when M is Zr, Z is not methylene or dialkylsilylene. In addition, when M is Zr and Z is α,2-benzylene, X is N. Finally, when M is Zr and Z is 1,8-naphthylene, X is N; and when M is Ti and Z is 1,8-naphthylene, X is O.

Exemplary complexes for catalysts of the invention include:

1
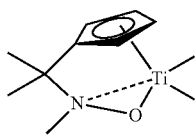

2
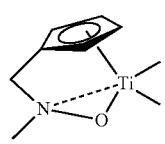

3
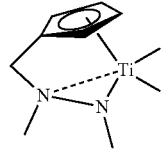

4
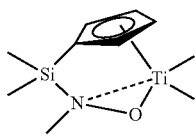

5
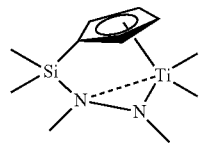

6
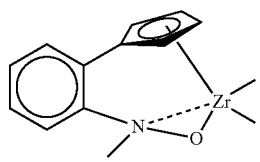

7
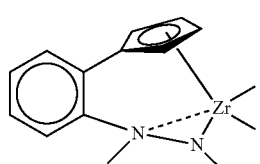

8
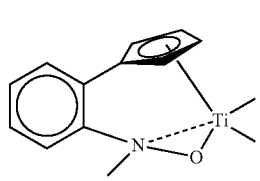

9
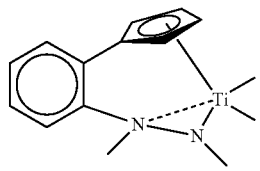

10
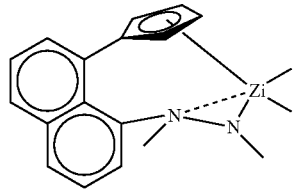

11
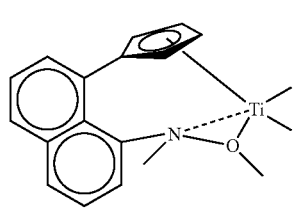

12
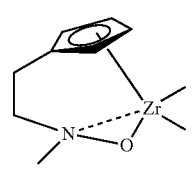

13
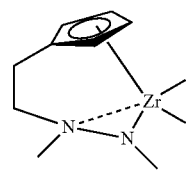

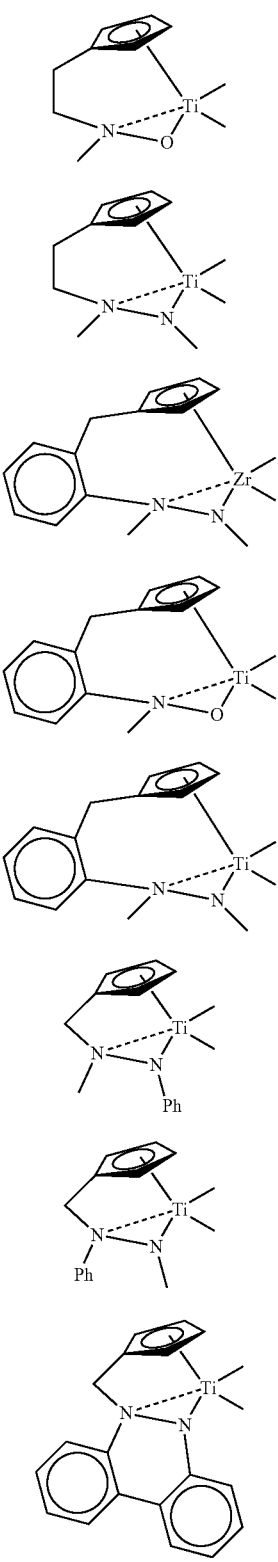

The complexes are preferably used with an inorganic solid support.

Suitable supports include silica, alumina, silica-aluminas, magnesia, titania, clays, zeolites, or the like. Silica is particularly preferred. The support is preferably treated thermally, chemically, or both prior to use to reduce the concentration of surface hydroxyl groups. Thermal treatment consists of heating is (or "calcining") the support in a dry atmosphere at elevated temperature, preferably greater than 100° C., and more preferably from 150 to 800° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. Preferably, the support is calcined silica that is treated with MAO prior to combination with the complex.

The complex and activator can be deposited on the support in any desired manner. For instance, the components can be dissolved in a solvent, combined with a support, and stripped. Alternatively, an incipient-wetness technique can be used. Moreover, the support can simply be introduced into the reactor separately from the complex and activator.

In one preferred approach, the activator is MAO, the support is calcined silica, and the MAO is combined with the silica in advance. Thus, the complex sees the MAO only after the MAO has been used to treat the silica.

Catalysts of the invention are useful for polymerizing olefins. Preferred olefins are ethylene and $C_3$-$C_{20}$ α-olefins such as propylene, 1-butene, 1-hexene, 1-octene, and the like. Mixtures of olefins can be used. Ethylene and mixtures of ethylene with $C_3$-$C_{10}$ α-olefins are especially preferred.

Many types of olefin polymerization processes can be used, including slurry, solution, suspension, high-pressure fluid, or gas-phase processes, or a combination of these. The catalysts are particularly valuable for slurry and gas-phase processes.

The olefin polymerizations can be performed over a wide temperature range, such as −30° C. to 280° C. A more preferred range is from 30° C. to 180° C.; most preferred is the range from 60° C. to 100° C. Olefin partial pressures normally range from 15 psig to 50,000 psig. More preferred is the range from 15 psig to 1000 psig.

Modeling Study:

To identify complexes suitable for use in the inventive catalysts, we evaluate three computational descriptors for model reactions involving the complexes. Based on empirical data available for similar complexes and calculation results for the known favorable complexes, we compare calculated data for potential new complexes to identify which ones are most likely, upon activation, to exhibit high activities and good comonomer incorporation ability. The calculations require us to assume that the ligands are principally ancillary, i.e., they do not significantly interact with the activator and are not transformed by it. The calculations are based on the well-established and reliable hybrid DFT method B3LYP with the 6-31G** basis, using an effective core-pseudopotential for the metal, as implemented in the Spartan '06 package of Wavefuctions, Inc. The computational descriptors or "reactivity indices" are $\Delta H_{stab}$, $\Delta H_{pi}$, and $\Delta E_{ins}$, which are defined more completely below.

The first reactivity index is $\Delta H_{stab}$, which estimates the stability of the cationic active site. The site needs to be reasonably stable in the presence of common activators. The requirement is quantified relative to the stability of $Cp_2ZrEt+$. A more negative value of $\Delta H_{stab}$ (in kcal/mol) indicates a higher stability relative to the metallocene standard in the following isodesmic model reaction:

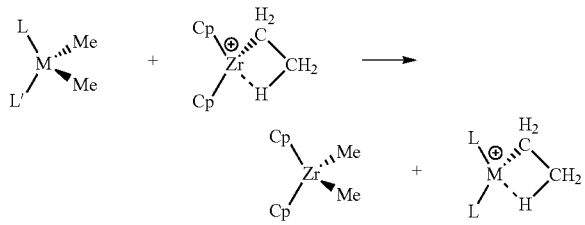

Based on a comparison of many calculations for known complexes, the value of $\Delta H_{stab}$ for the target complex should be <2 kcal/mol to have an effectively stabilized cationic center relative to the amount of stabilization enjoyed by the comparative model zirconocene.

Once it is generated, the active site also needs to readily form a π-complex with ethylene in the first step of the chain propagation process. This tendency is quantified relative to Cp$_2$ZrEt+ by the index $\Delta H_{pi}$. A more negative value of $\Delta H_{pi}$ indicates a higher inherent π-coordinating ability relative to the metallocene standard in the following isodesmic model reaction:

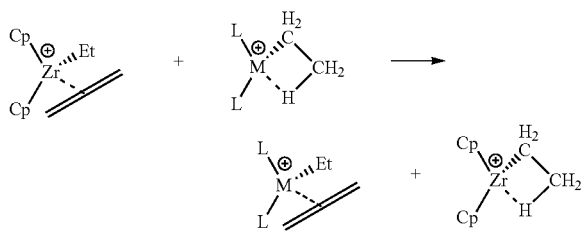

Based on calculations for known complexes, the value of $\Delta H_{pi}$ for the target complex should be <5 kcal/mol to have a cationic center that readily forms a pi-complex with ethylene relative to the coordinating ability of the comparative model zirconocene cation.

The third reactivity index is $\Delta E_{ins}$. This index evaluates how easily ethylene inserts into a metal-carbon bond for the complex of interest relative to the Cp$_2$Zr standard. The value for the Cp$_2$Zr standard is ~4 kcal/mol. As used herein, $\Delta E_{ins}$ is based on an optimized transition state model in which C—C bond forming is fixed at 2.2 Ångstroms. This provides a simple, quick estimate of the barrier that gives a reasonable idea about the relative propensity of various complexes to insert ethylene into a metal-carbon bond. Where multiple conformations or isomers are possible, the value of $\Delta E_{ins}$ represents the energy difference between the most stable pi-complex and the most stable transition state model, assuming that there is an allowed pre-equilibrium of pi-complexes.

Based on calculations for known complexes, the value of $\Delta E_{ins}$ for the target complex should be ≦7 kcal/mol for the complex to have a reasonable propensity for ethylene insertion into the growing polymer chain compared with the same insertion propensity when the complex is the model zirconocene.

To summarize, relative to the zirconocene model, complexes of the invention should have $\Delta H_{stab}$<2 kcal/mol, $\Delta H_{pi}$<5 kcal/mol, and $\Delta E_{ins}$≦7 kcal/mol for acceptable performance. Surprisingly, very similar complexes can have substantially different reactivity indices.

The above-described model successfully predicts the value of certain Cp*Ti complexes having constrained geometry relative to analogous complexes having a Cp or Zr. As shown in Comparative Examples 29-32 (Table 1), the model predicts that while all of the complexes have favorable $\Delta H_{pi}$ values, only Me$_2$Si(NMe)Cp*TiMe$_2$ will have the requisite $\Delta H_{stab}$<2 kcal/mol and $\Delta E_{ins}$≦7 kcal/mol. This agrees with experimental observations.

When we apply the model calculations to a variety of new bridged, half-sandwich complexes that have a monoanionic hydroxylamido or hydrazido group available for chelating the Group 4 metal, we see interesting distinctions.

Most significantly, complexes need not have a tetramethylcyclopenta-dienyl (Cp*) group to have favorable reactivity indices for each of $\Delta H_{stab}$, $\Delta H_{pi}$, and $\Delta E_{ins}$. While a relevant Cp* complex (C33) does show favorable indicies, each of Examples 1-21 uses a complex having a more-easily synthesized unsubstituted cyclopentadienyl moiety. This rebuts conventional wisdom by suggesting that a polyalkylated Cp ring need not be synthesized if the monoanionic hydroxylamido or hydrazido group is present.

Not all complexes of similar structure satisfy the criteria for favorable reactivity indices, however. For instance, Comparative Examples 22-25 show that the methylene or dimethylsilylene-bridged zirconium complexes are generally unfavorable. Moreover, some very similar complexes exhibit different results. Compare the subtle differences between inventive 1,8-naphthylene complexes 10 and 11 versus comparative complexes C26 and C27.

With a model that correctly identifies valuable constrained geometry complexes by assessing certain reactivity indices, other valuable complexes can be identified. Using this approach, we surprisingly found that certain Group 4 complexes having an unsubstituted Cp ring that is bridged to a monoanionic hydroxylamido or hydrazido group capable of chelating the metal meet this test and should offer high activities and other advantages to polyolefin makers.

TABLE 1

Bridged Half Metallocenes Based on η$^2$ NN and NO Chelates

| | | | Catalyst | | | Reactivity Indices | | |
|---|---|---|---|---|---|---|---|---|
| Ex | Cat # | M | Z | X | R$_1$, R$_2$ | $\Delta H_{stab}$ | $\Delta H_{pi}$ | $\Delta E_{ins}$ |
| 1 | 1 | Ti | (CH$_3$)$_2$C | O | Me | −2.2 | −5.0 | 5.5 |
| 2 | 2 | Ti | CH$_2$ | O | Me | 1.1 | −5.8 | 5.6 |
| 3 | 3 | Ti | CH$_2$ | N | Me, Me | −5.1 | −3.2 | 3.3 |
| 4 | 4 | Ti | Me$_2$Si | O | Me | −4.1 | −1.1 | 3.4 |
| 5 | 5 | Ti | Me$_2$Si | N | Me, Me | −11 | 2.8 | 2.1 |
| 6 | 6 | Zr | 1,2-phenylene | O | Me | −0.4 | −4.8 | 6.3 |
| 7 | 7 | Zr | 1,2-phenylene | N | Me, Me | −5.2 | −3.1 | 4.9 |
| 8 | 8 | Ti | 1,2-phenylene | O | Me | −5.8 | 0.2 | 5.4 |
| 9 | 9 | Ti | 1,2-phenylene | N | Me, Me | −12 | 3.6 | 2.7 |
| 10 | 10 | Zr | 1,8-naphthylene | N | Me, Me | −8.0 | −1.8 | 7.0 |
| 11 | 11 | Ti | 1,8-naphthylene | O | Me | −11 | 2.8 | 5.9 |
| 12 | 12 | Zr | CH$_2$CH$_2$ | O | Me | −0.3 | −3.8 | 4.7 |
| 13 | 13 | Zr | CH$_2$CH$_2$ | N | Me, Me | −5.8 | −1.6 | 3.1 |
| 14 | 14 | Ti | CH$_2$CH$_2$ | O | Me | −5.5 | 0.3 | 4.3 |
| 15 | 15 | Ti | CH$_2$CH$_2$ | N | Me, Me | −12 | 3.7 | 2.1 |
| 16 | 16 | Zr | α,2-benzylene | N | Me, Me | −7.4 | −1.8 | 6.5 |
| 17 | 17 | Ti | α,2-benzylene | O | Me | −11 | 1.4 | 6.8 |
| 18 | 18 | Ti | α,2-benzylene | N | Me, Me | −14 | 4.7 | 5.5 |
| 19 | 19 | Ti | CH$_2$ | N | Me, Ph | −5.8 | −0.3 | 3.1 |
| 20 | 20 | Ti | CH$_2$ | N | Ph, Me | −6.8 | −0.8 | 3.3 |
| 21 | 21 | Ti | CH$_2$ | N | Ph—Ph | −7.5 | −0.9 | 4.1 |

Criteria:
$\Delta H_{stab}$ < 2 kcal/mol; $\Delta H_{pi}$ < 5 kcal/mol; $\Delta E_{ins}$ (at 2.2 Å) ≦ 7 kcal/mol, all relative to the Cp$_2$ZrEt$_2$ analogs modeled using B3LYP/6-31G**/pseudo on Spartan '06.

TABLE 2

Comparative Examples

| Ex | Cat # | M | Z | X | $R_1, R_2$ | $\Delta H_{stab}$ | $\Delta H_{pi}$ | $\Delta E_{ins}$ |
|---|---|---|---|---|---|---|---|---|
| C22 | C22 | Zr | $CH_2$ | O | Me | 4.5 | −11 | 9.2 |
| C23 | C23 | Zr | $CH_2$ | N | Me, Me | −1.3 | −8.5 | 7.3 |
| C24 | C24 | Zr | $Me_2Si$ | O | Me | −0.9 | −8.5 | 9.5 |
| C25 | C25 | Zr | $Me_2Si$ | N | Me, Me | −4.5 | −6.7 | 8.2 |
| C26 | C26 | Zr | 1,8-naphthylene | O | Me | −2.1 | −4.6 | 8.5 |
| C27 | C27 | Ti | 1,8-naphthylene | N | Me, Me | −17 | 6.2 | 5.4 |
| C28 | C28 | Zr | α,2-benzylene | O | Me | −2.4 | −5.4 | 9.1 |
| C29 | C29 | | $Me_2Si(NMe)CpZrMe_2$ | | | 7.6 | −12 | 8.8 |
| C30 | C30 | | $Me_2Si(NMe)Cp*ZrMe_2$ | | | 3.9 | −10 | 7.7 |
| C31 | C31 | | $Me_2Si(NMe)CpTiMe_2$ | | | 5.2 | −5.8 | 4.0 |
| C32 | C32 | | $Me_2Si(NMe)Cp*TiMe_2$ | | | −0.8 | −3.2 | 3.8 |
| C33 | C33 | | $CH_2(NMeNMe)Cp*TiMe_2$ | | | −16 | 1.6 | 3.1 |

Criteria:
$\Delta H_{stab} < 2$ kcal/mol; $\Delta H_{pi} < 5$ kcal/mol; $\Delta E_{ins}$ (at 2.2 Å) ≤ 7 kcal/mol, all relative to the $Cp_2ZrEt_2$ analogs modeled using B3LYP/6-31G**/pseudo on Spartan '06.

EXAMPLE 34

Synthesis of Complex 1

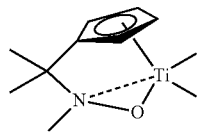

1

Following the method of Bernardi et al. (*J. Org. Chem.* 64 (1999) 641, N-methylhydroxylamine hydrochloride is combined with 1.1 eq. of 2,4,6-trimethylpyridine in pentane at room temperature for 12 h, followed by treatment with 1 eq. of 1-(trimethylsilyl)imidazole with stirring for 9 h. Filtration, concentration, and distillation should provide N-methyl-β-(trimethylsilyl)hydroxylamine.

n-Butyllithium (1.1 eq.) is added to N-methyl-β-(trimethylsilyl)hydroxylamine in THF at −78° C. to generate the corresponding amido anion. Dimethylfulvene (1 eq.) is slowly added at −78° C. The stirred mixture is allowed to warm to room temperature for 2 h, and it is then re-cooled to −78° C. Titanium tetrachloride (1 eq.) in dry toluene is slowly added to the cyclopentadienyl anion, and the mixture is warmed to room temperature and stirred overnight. The mixture is refluxed to eliminate trimethylsilyl chloride. After extractive workup, the titanium complex is isolated and reacted with 2 eq. of methyllithium according to well-known methods to generate titanium dimethyl complex 1 as the expected product.

EXAMPLE 35

Synthesis of Complex 4

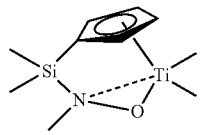

4

Dichlorodimethylsilane is reacted with one equivalent of sodium cyclopentadienide in ether to give $(Cp)Me_2SiCl$.

Separately, n-butyllithium (1.1 eq.) is added to N-methyl-O-(trimethylsilyl)hydroxylamine (prepared as described in Example 34) in THF at −78° C. to generate the corresponding amido anion. The amido anion and an equivalent of the silyl chloride are combined at −78° C., followed by stirring the mixture at room temperature overnight. This should provide, after workup, the desired ligand precursor, $(Cp)Me_2SiNMe$-OTMS.

Deprotonation with n-butyllithium to give a cyclopentadienide, followed by reaction in toluene with titanium tetrachloride and refluxing should eliminate chlorotrimethylsilane and give a titanium dichloride complex, which can be reacted with two equivalents of methyllithium to give 4.

EXAMPLE 36

Synthesis of Complex 5

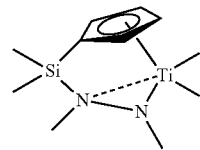

5

N,N'-dimethylhydrazine is converted to its monolithium salt by reaction with 1.1 eq. of n-butyllithium in THF at −78° C. The mixture warms to room temperature for 2 h, and is then chilled to −78° C. The mixture is combined with one eq. of $CpMe_2SiCl$ at −78° C. and stirred overnight at room temperature. After workup, the expected product is the desired ligand precursor, $(Cp)Me_2SiN(Me)$—N(Me)TMS. Repeating the remaining steps as in Example 35 should provide complex 5.

EXAMPLE 37

Synthesis of Complex 6

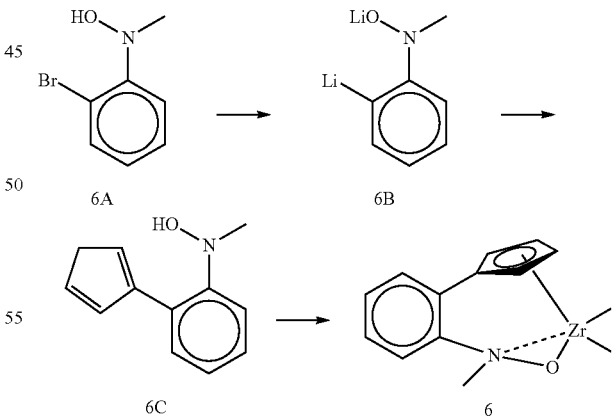

2-Bromo-N-methylaniline is converted to the corresponding hydroxylamine 6A by reacting it with $Na_2WO_4 \cdot 2H_2O$ and hydrogen peroxide as described in *Heterocycles* 43 (1996) 1855. Reaction of the hydroxylamine with two equivalents of n-butyllithium at −78° C., followed by warming to room temperature gives the ortho-lithiated N-alkoxide dianion, 6B. The dianion is combined with an equivalent of cyclopenten- 3-one followed by p-toluenesulfonic acid-catalyzed dehydration as described in *Chem. Ber.* 129 (1996) 459 and Eur. Pat. Appl. No. 0 791 607 (Ex. 4) to provide hydroxylamine ligand precursor 6C and isomers. Deprotonation with two equivalents of n-butyllithium and combination with zirconium tetrachloride, followed by methylation of the zirconium dichloride complex should give the desired complex 6.

We claim:

1. A catalyst useful for polymerizing olefins, comprising an activator and a complex of the structure:

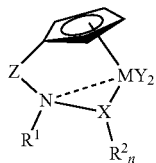

wherein M is a Group 4 metal; Z is a divalent linking group selected from the group consisting of methylene, ethylene, isopropylidene, dialkylsilylene, 1,2-phenylene, 1,8-naphthylene, and α,2-benzylene; X is N or O; each of $R^1$ and $R^2$ is independently $C_1$-$C_4$ alkyl or $C_6$-$C_{10}$ aryl; $R^1$ and $R^2$ can be joined together; n is 0 when X is O, and n is 1 when X is N; each Y is independently halide, alkyl, dialkylamido, aryl, or aralkyl; provided that: (a) when M is Zr, Z is not methylene or dialkylsilylene; (b) when M is Zr and Z is α,2-benzylene, X is N; (c) when M is Zr and Z is 1,8-naphthylene, X is N; and (d) when M is Ti and Z is 1,8-naphthylene, X is O.

2. The catalyst of claim 1 wherein M is titanium or zirconium.

3. The catalyst of claim 1 wherein Z is dimethylsilylene.

4. The catalyst of claim 1 wherein $R^1$ is methyl or phenyl.

5. The catalyst of claim 1 wherein X is N and $R^2$ is methyl or phenyl.

6. The catalyst of claim 1 wherein Y is halide or alkyl.

7. A supported catalyst of claim 1.

8. The supported catalyst of claim 7 wherein the support is MAO-treated silica.

9. The catalyst of claim 1 wherein the activator is selected from the group consisting of alumoxanes, alkylaluminum compounds, ionic borates, ionic aluminates, organoboranes, and aluminoboronates.

10. A process which comprises polymerizing one or more olefins in the presence of the catalyst of claim 1.

* * * * *